United States Patent [19]
Browning

[11] 3,782,764
[45] Jan. 1, 1974

[54] KNOT TYING DEVICE
[76] Inventor: Charles W. Browning, 4645 E. 57th St., Tulsa, Okla. 74135
[22] Filed: Oct. 18, 1971
[21] Appl. No.: 190,220

[52] U.S. Cl. .............................................. 289/17
[51] Int. Cl. .............................................. D03j 3/00
[58] Field of Search .................. 289/1.2, 1.5, 17; 43/21.2, 25.2

[56] References Cited
UNITED STATES PATENTS
2,926,036  2/1960  Wimberley ............................. 289/17

Primary Examiner—Louis K. Rimrodt
Attorney—Carl F. Geppert et al.

[57] ABSTRACT

A knot tying device and method, especially for use in the knotting of monofilament line to fish hooks or lures where the device is generally attached to or is a part of the handle of a fishing rod and includes a pair of jaws, one of which is movable to provide a pair of winding surfaces that may alternately be diverging or converging at their free ends. The jaws are initially held in a diverging relationship so the fishing line threaded through the eye of the hook can be wound onto the jaws without inadvertently slipping off; the hook being held adjacent the jaws. The free end of the line is positioned between the jaws and held there when the jaws are released, the line is held and the hook is pulled to pull the loops of line off of the jaws and onto the line, and the resulting knot is tightened.

23 Claims, 43 Drawing Figures

KNOT TYING DEVICE

The present invention relates to a novel knot tying device and to a method of tying to form a new and novel knot, especially for the tying of a fish hook or lure onto a monofilament line.

With the modern monofilament fishing lines commonly in use today, extreme care and pateince are required to tie a suitable holding knot in the line to secure a fish hook or lure thereto. This is particularly true if the fisherman does not have great manual dexterity. In my previous patent application Ser. No. 821,658, now U.S. Pat. No. 3,575,449 I disclosed a novel knot tying device that could be carried in the fisherman's pocket and could be easily used to quickly tie a good holding knot. The present invention relates to a different approach to knot tying where the tying device is generally munted on or made a part of the handle of the fishing pole or rod used by the fisherman.

Among the objects of the present invention is the provision of a novel knot tying device which is formed as a part of or mounted on the handle of a fishing rod or pole adjacent to the fishing reel for ease of handling. A potential knot is formed by storing various segments of the knot in given positions on the knot tyer, and then the stored portions are freed in a given sequence to form a small and effective holding knot that is especially adaptable to modern monofilament fishing line.

Another object of the present invention is the provision of a novel knot tying device having a clamping means that also acts as a winding drum for the line during formation of the knot. The clamping means is initially expanded to create a greater winding area at the free end of the device so as to retain the line being wound on the drum. Once the windings have been completed, the angle of the clamping means is reversed to clamp the free end of the line and decrease the winding area at the free end of the device. The decrease in winding area aids in freeing the hard to control line so that the coils may be pulled off the winding area to form the finished knot.

A further object of the present invention is the provision of a knot tying device which may be fixed to any object as a protusion, incorporated in a handle as a part thereof, or be formed as a pencil-like device to be carried in the user's pocket. The knot tyer may also incorporate a line cutter in the end of the device or in a handle incorporating the device.

The present invention also comprehpnds the provision of a novel method of tying a knot which cannot be duplicated by hand. The tying method includes the steps of storing a portion of the line on an object and then transferring the stored portion back onto the line itself.

Further objects are to provide a construction of maximum simplicity, efficiency, economy and ease of assembly and operation, and such further objects, advantages and capabilities as will later more fully appear and are inherently possessed thereby.

Figures 1, 2, 3, 4:
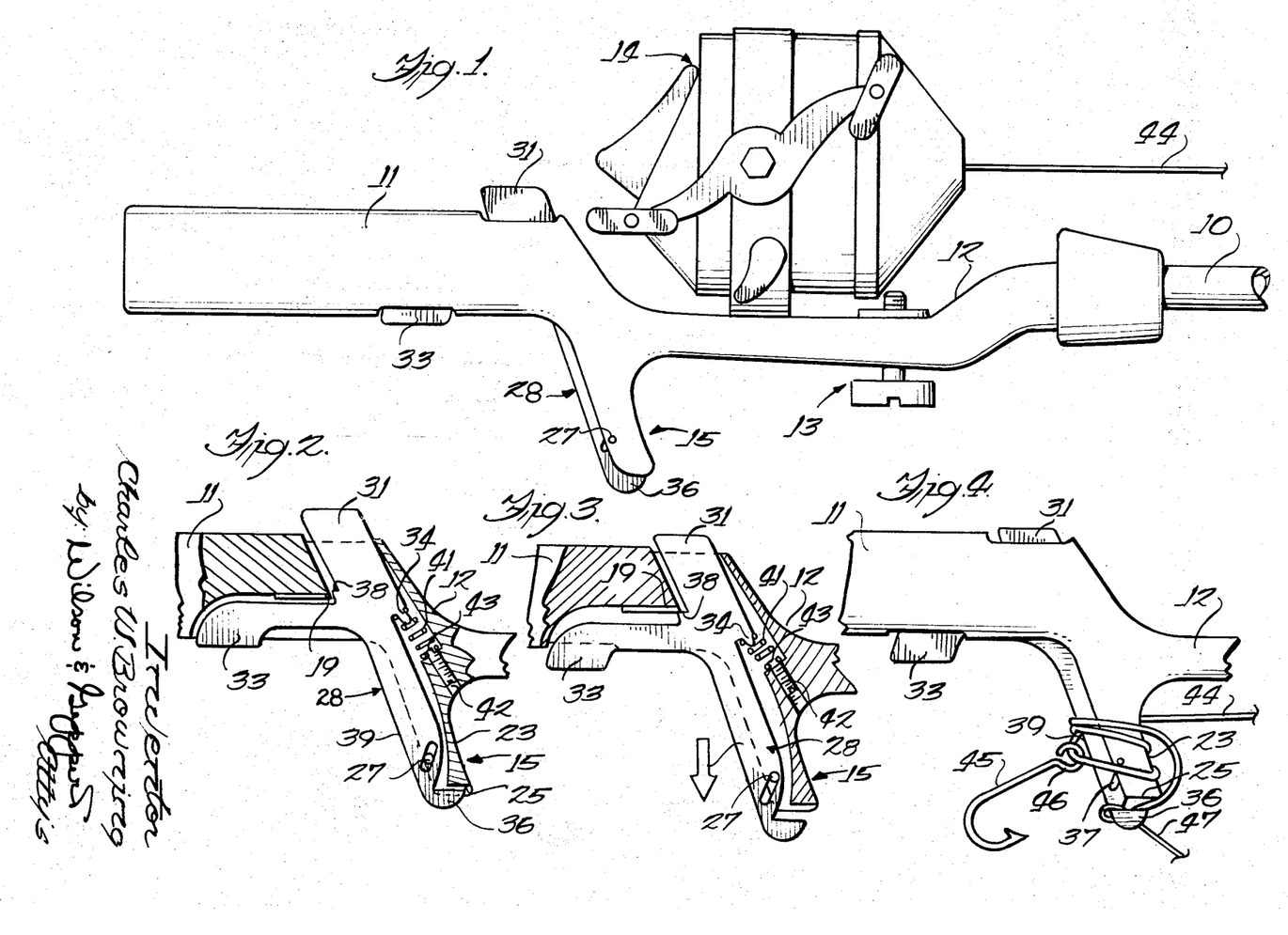
FIG. 1 is a partial side elevational view of one form of knot tying device mounted in a handle of a fishing rod or pole adjacent the reel.
FIG. 2 is a side elevational view of a portion of the handle cut away to show the knot tying device in its contracted clamping position.
FIG. 3 is a view similar to FIG. 2 but showing the device in its expanded position.
FIG. 4 is a side elevational view of the handle and knot tying device in thp expanded position with the line being wound thereon.

Referring more particularly to the disclosure in the drawings wherein are shown illustrative embodiments of the present invention, FIG. 1 discloses a fishing rod or pole 10 having a handle 11 and a recessed area 12 with suitable mounting means 13 to removably mount a fishing reel 14 thereon. At the forward end of the handle 11 and adjacent the recessed area 12 is a generally downwardly extending projection 15 which may be used as a finger grip in manipulating the rod and reel during fishing.

Figures 7, 8, 12, 13, 14:
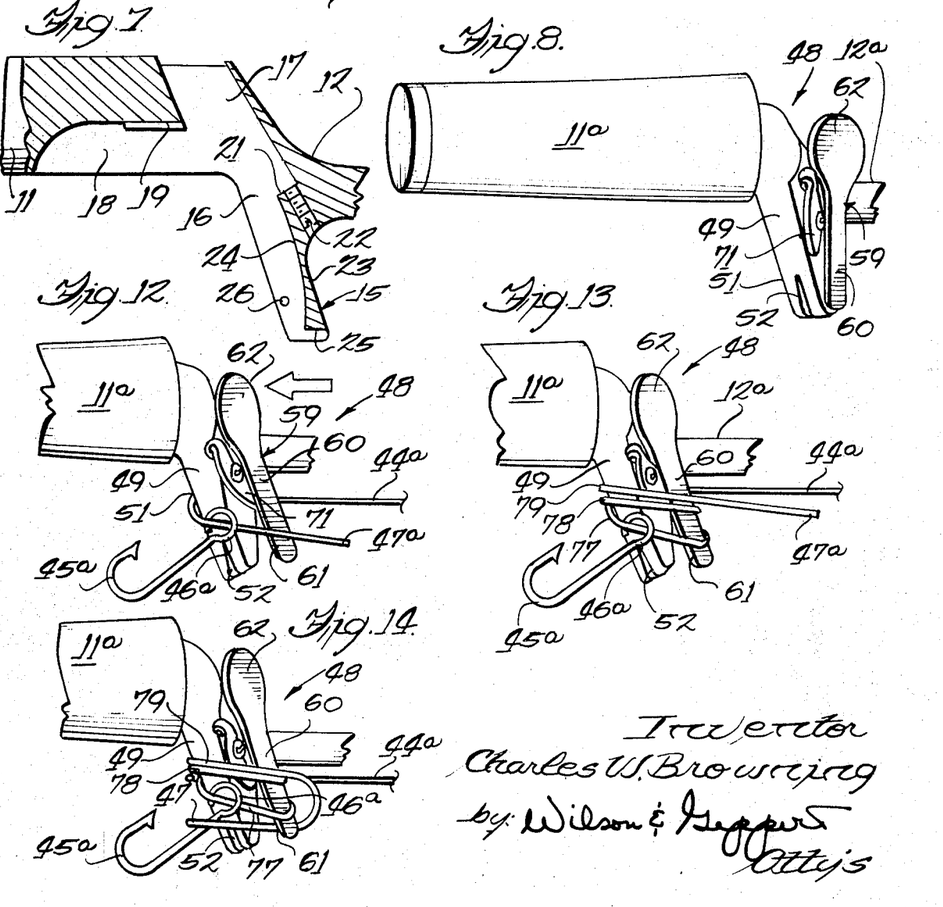
FIG. 7 is a cut away view of the handle showing the area receiving the operator.
FIG. 8 is a perspective view of a second embodiment of knot tying device mounted on a finger projection of a handle for a fishing rod.
FIGS. 12 through 17 are perspective views of the knot tying device of FIG. 8 showing the steps in the formation of a knot.

As more clearly shown in FIG. 7, an elongated cutaway area or recess 16 is formed in the projection 15 and extends upward as a passage 17 through the handle 11 and also extends generally laterally at 18 on the underside of the handle. The recess is formed with a catch or shoulder 19 at the intersection of the recess 18 and passage 17, a forward shoulder 21, with a threaded opening 22 extending between the shoulder and the forward surface 23 of the projection 15, and a curved surface 24 terminating in a clamping jaw 25. An opening 26 extends through the projection 15 at either side of the recess 16 to receive a guide and retainer pin 27 which extends across the recess for an operator 28.

Figure 6:
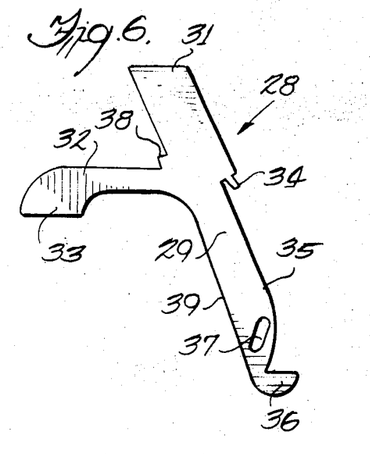
FIG. 6 is a side elevational view of the movable operator of the device.

The operator 28, as shown in FIG. 6, includes an elongated body portion 29 having an upwardly extending operating projection or button 31 and a lateral arm 32 terminating in a downwardly extending end 33. The body portion 29 has a return spring stub 34 with a curved surface 35 therebelow and terminating in a lateral clamping jaw 36. An angularly disposed elongated slot 37 is formed in the body portion 29 to receive the pin 27 therethrough, and a catch notch 38 is formed adjacent the intersection of the lateral arm 32 and body portion 29 on the button 31. The body portion 29 provides a winding surface 39 on the edge opposite the curved surface 35, and the projection 15 provides the forward stationary winding surface 23.

Figure 5:
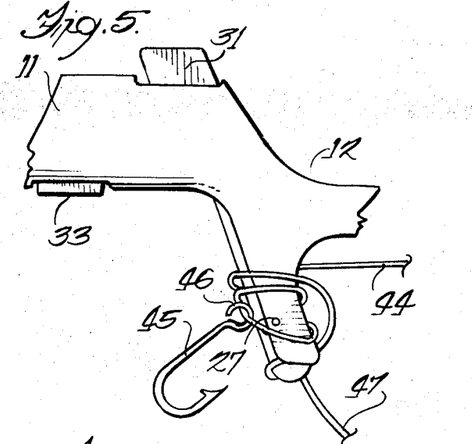
FIG. 5 is a view similar to FIG. 4 with the device in its clamping position prior to pulling off the wound loops of line.

The operator 28, as seen in FIGS. 2 and 3, is mounted in the recess 16 with a compression spring 41 having one end engaging the return spring stub 34 of the operator and the opposite end engaging and encompassing the inner reduced end 43 of an adjustment screw 42 received in the threaded opening 22 biasing the operator to the position shown in FIGS. 2 and 5. To tie a knot in a fish line 44 from the reel 14, the end 47 of the line is threaded through the eye 46 of a fish hook 45 or other suitable lure. The button 31 is depressed causing the operator 28 to move downwardly and rearwardly guided by the pin 27 acting in the slot 37 against the force of the compression spring 41 until the notch 38 engages the catch 19 to retain the operator in the position of FIGS. 3 and 4. The curved surfaces 35 and 24 on the operator 28 and in the recess 16, respectively, also aid in the movement of the operator 28 to cause the winding surfaces 23 and 39 to diverge toward the free end of the projection.

As seen in FIG. 4 and as will be more completely described with reference to FIGS. 12–18, the line 44 is positioned with the hook 45 adjacent the surface 39, and the free end 47 of the line 44 is wound onto the winding surfaces 23 and 39 for approximately three turns and the end 47 is then positioned between the clamping jaws 25 and 36. The diverging surfaces act to prevent the windings of the line from slipping off of the projection 15.

As seen in FIG. 5, the operator 28 is released by a forward movement of either the button 31 of the depending end 33 to disengage the notch 38 from the catch 19, and the spring 41 returns the operator to its normal position with the jaws 25 and 36 releasably clamping the line end 47. The winding surfaces now slightly converge toward the free end to allow the hook and windings to be pulled off of the projection 15 to form the knot, as will be later more fully described. The projection 15 may also incorporate line cutting means, more closely shown in FIGS. 22 or 23, to trim excess line from the finished knot.

Referring to FIGS. 8–21, a second embodiment of knot tying device 48 is disclosed located on a finger projection 49 formed integral with the handle $11^a$ of a fishing rod or pole having a recess $12^a$ to receive and secure a suitable reel. This projection 49 extends below the handle and has a winding surface 51 thereon. Formed in the end of the projection is a slot 52 thereacross opening at the end and of a width to freely receive the finishing line $44^a$. A pair of channels 53, 53 are formed perpendicular to (FIG. 22) or angularly disposed (FIG. 23) to the slot 52 to receive a pair of cutting blades 54,54 which converge (FIG. 24) away from the open end of the slot 52 for use in cutting off the excess end of the line.

Formed on one side surface 55 of the projection is a raised hinge block or bearing 56 (FIG. 19) having an opening 57 therethrough to receive a pivot pin 58 mounting a pivot lever 59 on the projection. The pivot lever 59 has an elongated body 60 acting as a winding surface with a line gripping area 61 and an enlarged manual actuation surface 62 at the opposite end. A pair of spaced depending ears 63 (FIG. 20) formed integral on the underside of the lever are adapted to encompass the hinge block 56 and having openings 64 to receive the pivot pin 58. A lever spring 65 (FIG. 21) has coils received on the pivot pin 58 with an arm 66 engaging the surface 55 and a second arm 56 engaging the underside of the actuation surface 62 to bias the lever 59 in a counterclockwise direction as seen in FIG. 10.

The side surface 55 also has a threaded opening 68 therein to receive a retainer screw 69 pivotally mounting a trigger or catch 71 adjacent the pivot lever 59; the trigger having an actuating end 72 adapted for manual actuation. A spacer washer 73 is mounted on the screw 69 below the trigger 71, and a trigger spring 74 has its coils encompassing the screw 69 below the trigger. One end 75 of the spring 74 bears against the bearing 56 and the other end 76 is secured in the actuating end 72 to bias the trigger in a counterclockwise direction as seen in FIG. 9.

Figures 9, 10, 11, 15, 16, 17, 18:
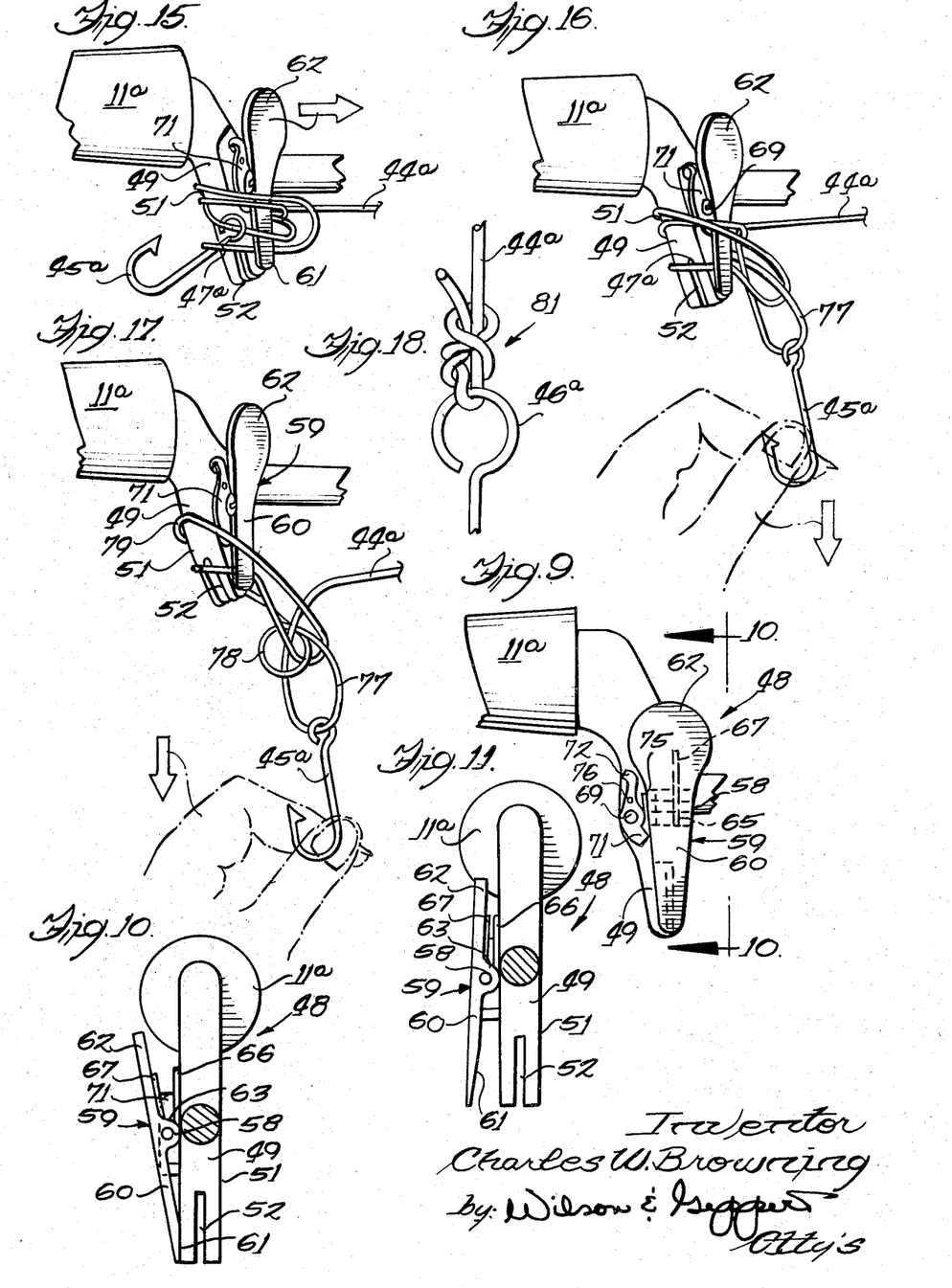
FIG. 9 is a side elevational view of the device of FIG. 8.
FIG. 10 is a vertical cross sectional view taken on the line 10—10 of FIG. 9 with the device contracted.
FIG. 11 is a view similar to FIG. 10 showing the device in its expanded state.
FIG. 18 is an enlarged view of the finished knot.

Considering FIGS. 9 through 18, the operation of this embodiment of knot tying device 48 is shown as well as the general method of tying the novel knot in a fishing line 44ᵃ, such as a monofilament line. The device is shown in its normal position in FIGS. 8,9 and 10, and to initiate the knot tying operation, the actuation surface 62 of the pivot lever 59 is manually depressed to lift the body 60 and allow the trigger 71 to be biased into the space between the body 60 and the surface 55 of the finger gripping projection 49. Holding the lever 59 in this position causes the winding surfaces 51 and 60 of the projection 49 and the lever 59, respectively, to diverge toward the free end of the projection (FIG. 11).

The end 47ᵃ of the line 44ᵃ is threaded through the eye or loop 46ᵃ of a fishhook or lure 45ᵃ and is brought down from the end of the fishing rod around the projection 49 and up with the fishhook 45ᵃ positioned adjacent the projection as shown in FIG. 12. The end is then wrapped for three turns around the winding surfaces 51 and 60 and around the line 44ᵃ, as shown in FIG. 13, to provide a first loop 77, a second loop 78 and a third loop 79. The divergence of the winding surfaces toward the free end of the projection creates a greater winding area at the outer end than at the pivot pin 58 to retain the hard to control monofilament line on the winding surfaces while winding is accomplished.

After the three loops have been wound onto the winding surfaces, the free end 47ᵃ is wrapped around the end of the body 60 under the line gripping surface 61 as shown in FIG. 14. The trigger 71 is then manually rotated in a clockwise direction against the force of the spring 74 to release the pivot lever 59, and the spring 65 will bias the lever towards its normal position so that the line end 47ᵃ is gripped between the line gripping area 61 of the lever 59 and the surface 55 of the projection (FIG. 15).

To complete the knot, the user grips the hook 45ᵃ and pulls the hook downward to pull the first loop 77 off of the winding surfaces 51 and 60 (FIG. 16) followed by the second loop 78 (FIG. 17) and the third loop 79. Continued pulling on the hook will pull the loose end 47ᵃ free of the gripping area 61 and surface 50. The knot is then tightened by pulling on the hook 45a and the main line 44 to form the knot 81 seen in FIG. 18. After completion of the knot 81, the loose end 47ᵃ is easily severed by pulling it down into the slot 52 against the cutter blades 54.

When the trigger 71 is rotated to release the pivot lever 59, the angle of the lever is reversed with the winding surfaces 51 and 60 converging toward the free end with a greater winding area at the pivot pin 58 and a lesser winding area at the line gripping end 61. The lesser winding area will greatly assist in freeing the hard to control monofilament fish line from the tying device as above described. In forming the knot by pulling on the hook, the first turn becomes the first loop which is stored around the line 47ᵃ of the line. Further pulling causes the second turn to become the second loop which is also stored around the end of the line and is connected to the first loop. Then the third turn becomes the third loop which is also stored around the end of the line and is connected with both the first and second loops. Thus, a novel knot is formed most effectively to secure the hook 45ᵃ onto the line 44ᵃ.

Figures 19, 20, 21, 22, 23, 25:
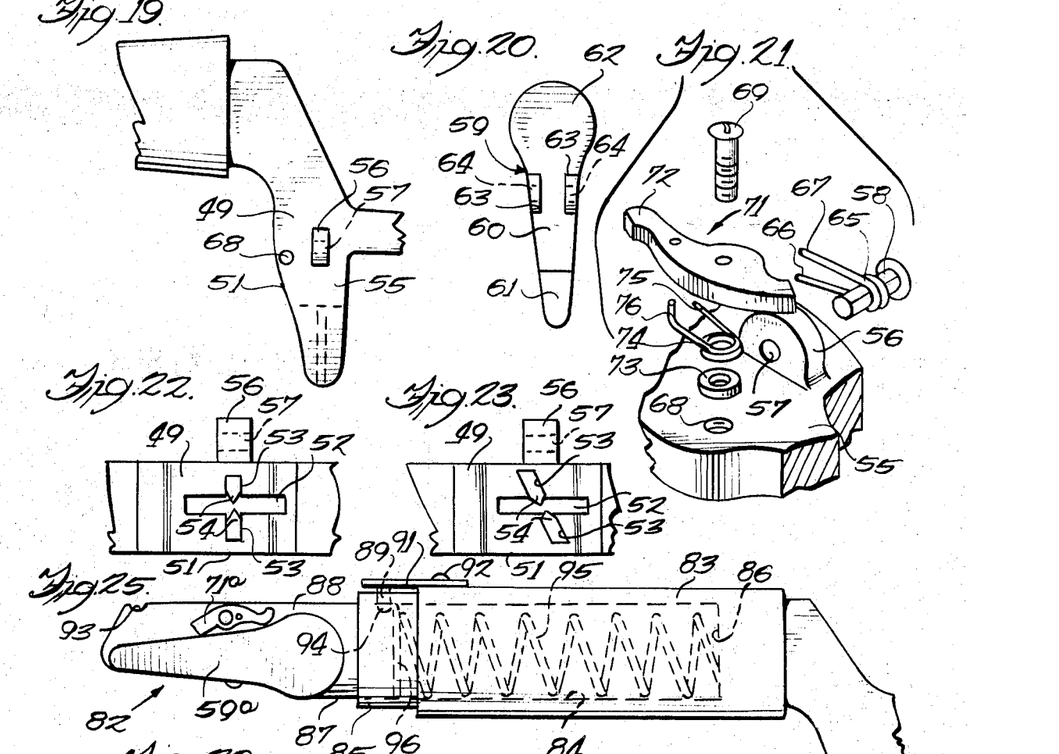
FIG. 19 is a partial side elevational view of the handle and finger projection showing the mounting for the device.
FIG. 20 is a bottom plan view of the pivot lever.
FIG. 21 is an enlarged perspective view of the trigger and mounting for the lever.
FIG. 22 is an end elevational view of the handle projection showing one form of line cutting means.
FIG. 23 is a view similar to FIG. 22 showing an alternate form of line cutting means.
FIG. 25 is a side elevational view of a third embodiment of knot tying means.

FIG. 25 discloses a third embodiment of a knot tying device 82 which is mounted in a hollow handle 83 of a fishing rod or pole. The handle has a generally cylindrical passage 84 opening at the inner end 85 of the handle and terminates in an inner closed end surface 86. A plunger 87 has a flattened surface 88 and is tapered toward the free end. A detent 89 on a flat spring 91 secured to the handle at 92 is received in an opening in the handle to project into one of two spaced recesses 93 or 94 formed on the plunger. A compression spring 95 is located in the passage 84 with one end abutting the inner passage end surface 86 and the opposite end engaging the inner end 96 of the plunger 87. The tying device is mounted on the flattened surface 88 and is substantially identical to that shown in FIGS. 8–21, including a spring-biased pivot lever 59ᵃ and a spring-biased trigger 71ᵃ.

When not in use, the plunger 87 is manually retracted into the handle 83 against the force of the spring 95 with the detent 89 engaging the outer notch 93. Lifting of the detent 89 releases the plunger 87 and allows it to be projected to operative position limited by the detent 89 engaging the inner notch 94. The knot tying operation is identical with that shown in FIGS. 10 through 18.

Figures 24, 27:
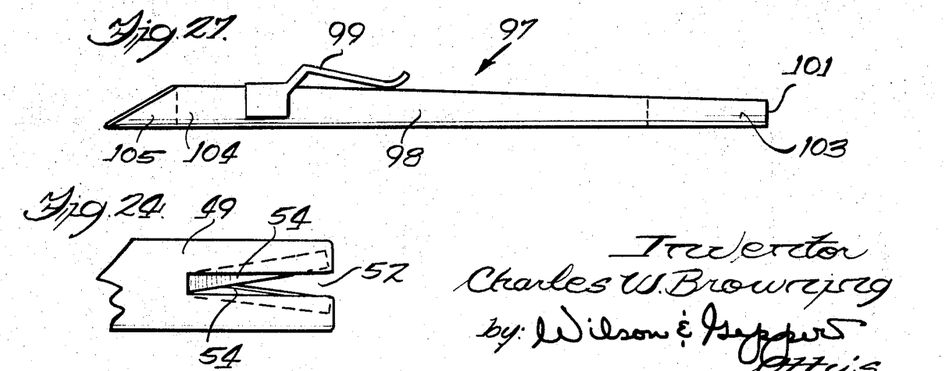
FIG. 24 is a side elevational view of the projection of FIG. 22 or FIG. 23 showing the orientation of the cutting blades.
FIG. 27 is a side elevational view of the knot tying means of FIG. 26
Figure 26:
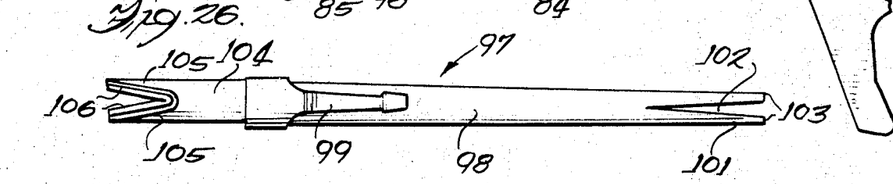
FIG. 26 is a front elevational view of a pencil-like fourth embodiment of knot tying means.

FIGS. 26 and 27 disclose a fourth embodiment of knot tying device 97 reduced to its simplest form. This device has the general shape and size of a pen or pencil with a tapered body 98 having a pencil clip mounted thereon for convenience in storing. At the smaller end 101, a wedge-shaped cavity 102 is formed by jaws 103,103 and at the opposite end 104, a pair of jaws 105,105 are formed with converging cutting blades or edges 106,106. The jaws 105,105 are cut on a slant as seen in FIG. 26.

The knot tying operation is generally the same, except this device does not provide the reversible diverging and then converging winding area. The line is wound onto the end 101 with the loose line end then being clamped in the cavity 102 so that the hook and loops can then be pulled off to form the knot. Winding must be performed with greater care so that the turns do not slip off of the tapering surface. The loose end may be cut off by the cutting edges 106,106 after the knot is tightened.

It is important that in storing the potential knot on the winding surface of the knot tyer, part of the turns are stored behind the hook or line, i.e. between the hook and the handle, and that the last half turn is stored in front of the hook. This novel arrangement and the manner of removing the turns provides the novel knot configuration. Also, although not shown, a cutting means obviously can be utilized in the knot tying device shown in FIGS. 1–7.

FIGS. 28 through 33 disclose a fifth embodiment of knot tying device wherein the clamping means for the end of the fishline is automatically released after the line has been wound upon the winding surface and clamping area. A fishing pole or rod 10ᶜ has a handle 11ᶜ somewhat similar in exterior configuration to that shown in FIG. 1 or FIG. 8 where the handle has a depending projection 107 adjacent the recessed area 12ᶜ for a suitable reel carrying the fishing line 108. The projection 107 is hollow to provide a chamber 109 to receive and house the line holding means; the projection opposite an opening 111 approximately midway along its length, and a second opening 112 is provided in the handle forwardly of but adjacent the projection 107.

The line-holding device 113 received in the chamber 109, which extends partially into the recessed area 12ᶜ of the handle 11ᶜ, includes an operator lever 114 having a button 115 at one end projecting out of the second opening 112. The lever 114 is pivoted on a pin 116 extending transversely through the projection 107, and has an arm 117 extending substantially perpendicular to the lever generally apposite the pivot pin 116. The arm 117 terminates in an enlarged end forming spaced line-holding fingers 118 opposite the first opening 111, through which the fingers will project as seen in FIGS. 30 and 31.

At the inner end of the lever 114 is a pin or rivet 119 pivotally connecting a plunger stem 121 thereto. The plunger stem extends through a small opening 122 in the end 123 of the projection 107 and terminates in an enlarged line gripping knob 124 which will normally abut the end 123 of the projection (see FIGS. 28 and 29). At a point intermediate the ends of the plunger step 121, a retainer catch 125 is formed on the stem and acts to cooperate with a retainer shoulder 126 formed on the wall of the chamber 109. A return spring has a coil 127 encompassing the pivot pin 116, a short end 128 engaging and secured to the wall of the chamber 109 adjacent the second opening 112, and a long bowed end 129 which is bent at 131 and received in an opening in a short projection 132 at the inner end of the plunger stem 121.

Figures 28, 29, 30, 31, 32, 33, 34, 35:
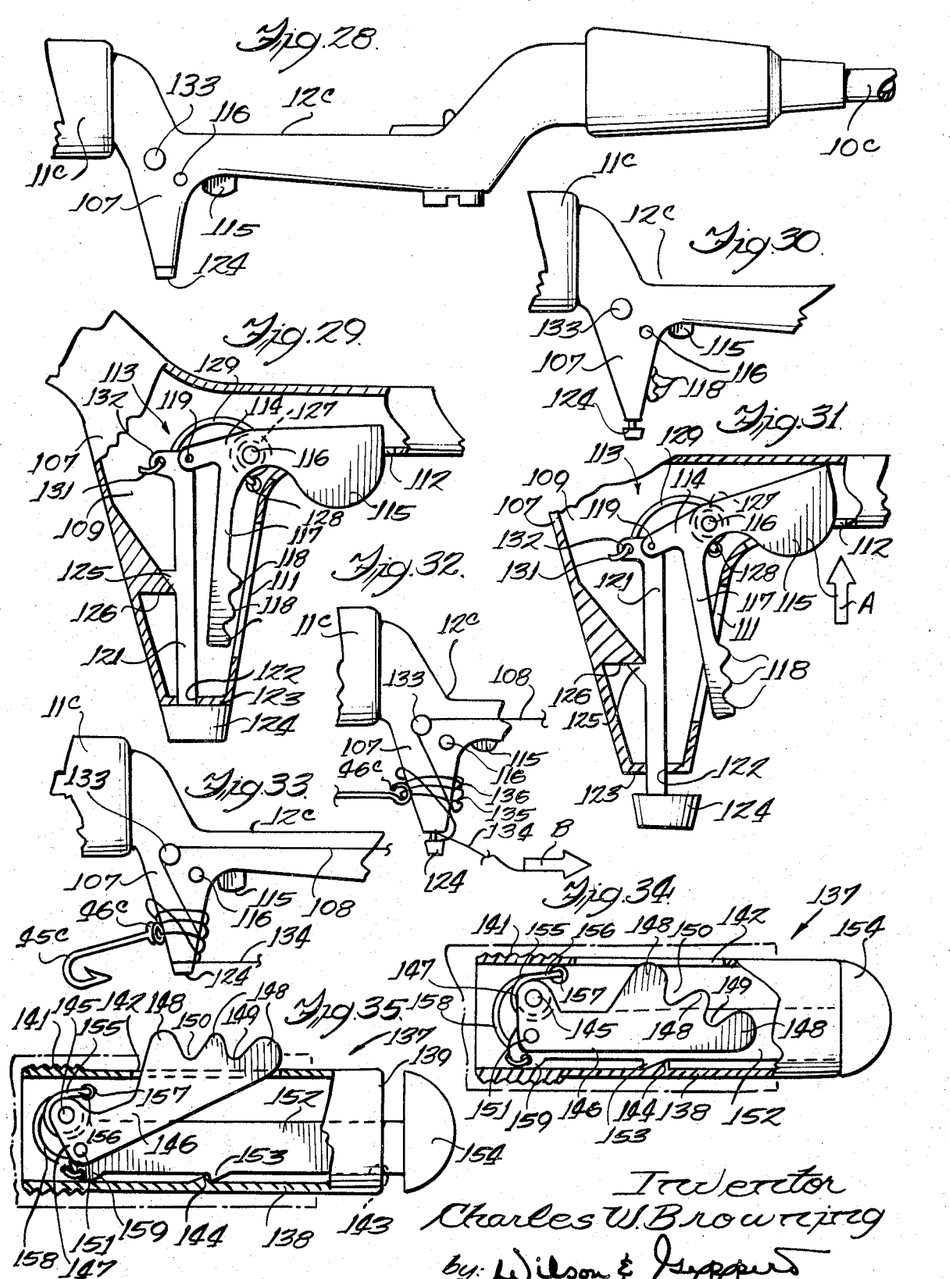
FIG. 28 is a side elevational view of a fifth embodiment of knot tying means utilizing an automatic release for the line clamping means.
FIG. 29 is a cross sectional view through the knot tying means of FIG. 28 with the device in closed position.
FIG. 30 is a side elevational view similar to FIG. 28 but showing the device in open position.
FIG. 31 is a cross sectional view similar to FIG. 29 but with the device in open position.
FIG. 32 is a side elevational view showing the device in open position with the line wound thereon.
FIG. 33 is a side elevational view similar to FIG. 31 but with the device released to clamp the end of the line.
FIG. 34 is a cross sectional view of a sixth embodiment of a knot tying device in a capsule to be attached to a fishing pole.
FIG. 35 is a cross sectional view similar to FIG. 34 but with the device open.

The device 113 is shown in its normal closed position in FIGS. 28 and 29. To open the device in readiness for a knot tying operation, the operator button 115 is depressed in the direction of the arrow A into the chamber 109 to pivot the lever 114 and the arm 117 about the pivot pin 116. Pivotal motion of the arm 117 projects the line-holding fingers 118 through the first opening 111 as seen in FIGS. 30 and 31. Also, pivotal movement of the lever 114 projects the plunger stem 121 downwardly to move the enlarged knob 124 away from the end 123 of the projection 107 and the retainer catch 125 passes over and engages the retainer shoulder 126 in view of the influence of the spring end 129 on the projection 132 to urge clockwise rotation of the plunger stem 121 about the rivet 119.

With the spaced line-holding fingers 118 projecting through the opening 111 and the plunger stem 121 and knob 124 projected as seen in FIGS. 30 and 31, the device is now ready for a knot tying operation. The line 108 from the fishing reel is brought down from the end of the rod 10ᶜ and passed over a line tension holder button 133 suitably mounted on the exterior of the projection 107. The ine end 134 is threaded through the eye 46ᶜ of a fish hook 45ᶜ and then wrapped around the projection with the first turn through notch 135 between the spaced fingers 118 and the next two turns through the second notch 136. The line end 134 is then passed once around the plunger stem 121 to arrive at the position shown in FIG. 32.

A slight upward pull on the line end 134 in the direction of the arrow B after it is passed around the plunger stem 121 will cause the stem to be rotated in a counter-clockwise direction about the rivet 119 and against the force of the spring end 129. The rotation of the stem 121 will cause disengagement of the retainer catch 125 with the shoulder 126 to release the stem. The force of the spring end 129 will then cause retraction of the plunger stem 121 to clamp the line end 134 and retraction of the arm 117 and line-holding fingers 118 to release the loops or windings of the line 108. Now the hook 45ᶜ is grasped and pulled downward to sequentially pull the loops off of the projection 107 and then tighten the knot as previously described for FIGS. 15–17.

FIGS. 34 and 35 disclose a sixth embodiment of knot tying device 137 similar to that shown in FIGS. 28–33 but utilized for attachment to a conventional fishing pole. The device 137 is in the form of a capsule having a generally cylindrical hollow housing 138, closed at one end 139 which is adapted to be inserted into an opening or passage drilled into the handle of the fishing rod. The inner end of the housing can be externally threaded as at 141 to aid in securing the housing in the handle. Also, a slot would be milled in the handle, where the housing is completely received in the opening, to allow for projection of the line-holding fingers. However, the capsule housing could obviously be only partially inserted into the handle to expose the opening for the fingers.

The housing includes an elongated slot 142 on one side thereof and an off-center opening 143 in the closed end 139. Also, a retainer shoulder 144 is formed on the interior surface of the housing opposite the slot 142 and generally intermediate the ends of the housing. A pivot pin 145 extends across and is secured in the housing adjacent the threaded end 141 to pivotally mount the laterally extending end 147 of a line retaining lever 146. The lever terminates in an enlarged free end forming the spaced line retaining fingers 148 defining the notches 149,150 therebetween.

A rivet 151 at the corner of the lever 146 pivotally secures a latch and release lever 152 to the lever 146. The latch and release lever 152 includes a retainer catch 153 formed intermediate the ends adapted to cooperate with the shoulder 144 on the housing 138, and extends through the off-center opening 143 to terminate in a knob 154. A spring has the coils 155 thereof encompassing the pivot pin 145 with one end 156 connected to the cylinder through a small opening 157 and the opposite end 158 is connected to the upper corner 159 of the latch and release lever 152 to urge the lever 152 to rotate in a clockwise direction, and the lever 146 is urged in a clockwise rotation due to the rivet 151 linking the levers together.

To operate this embodiment, the knob 154 is manually pulled outwardly from the housing 138 from the position of FIG. 34 to rotate the lever 146 to a counter-clockwise direction and project the spaced fingers 148 through the slot 142 and the aligned slot in the handle, if required. The retainer catch 153 is also moved downward over the shoulder 144 and engages therewith to hold the device as shown in FIG. 35. The line is then wound thereon as described for FIGS. 33 and 34, and an upward pull on the line end after being wrapped once about the lever 152 causes release of the retainer catch 153 from the shoulder 144 and return of the levers to the position shown in FIG. 34 with the end of the line clamped between the housing end 139 and the knob 154. The hook and line are then pulled off of the housing and the knot thus formed is tightened.

Figures 36, 37, 38, 39, 40, 41, 42:
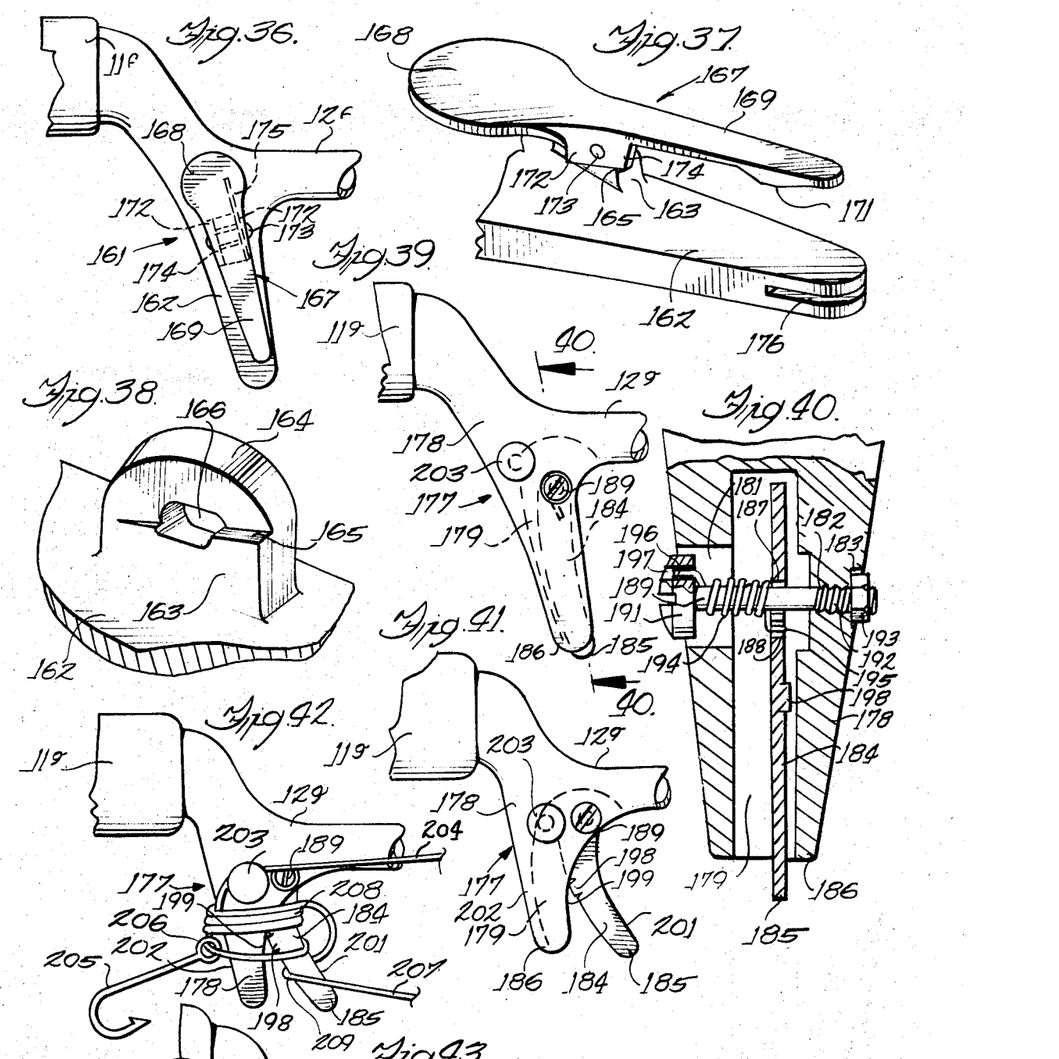
FIG. 36 is a side elevational view of a seventh embodiment of the present knot tying device.
FIG. 37 is an enlarged perspective view of the knot tying device of FIG. 36 with the pivot lever in the open winding position.
FIG. 38 is an enlarged perspective view of the hinge block or bearing for the pivot lever shown in FIGS. 36 and 37.
FIG. 39 is a side elevational view of an eighth embodiment of knot tying device.
FIG. 40 is an enlarged vertical cross sectional view taken on the line 40—40 of FIG. 39.
FIG. 41 is a side elevational view similar to FIG. 39 but showing the parts in their winding position.
FIG. 42 is a view similar to FIG. 41 but showing a fishing line wound on the device.
Figure 43:
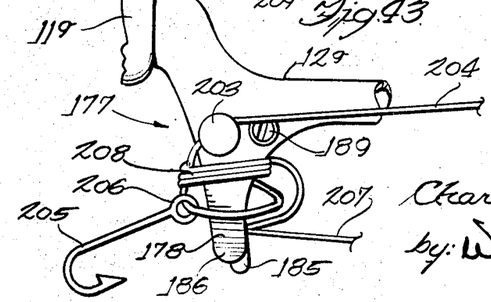
FIG. 43 is a view similar to FIG. 42 but showing the trigger in its released clamping position prior to formation of the knot.

FIGS. 36, 37 and 38 disclose a seventh embodiment of knot tying device 161 which is simplified over the device 48 of FIGS. 8–21 by the omission of the trigger. The device is mounted on a finger projection 162 formed on the handle 11ᶠ of a fishing rod having a recess 12ᶠ for a reel to be secured thereon. A hinge block or bearing 163 (FIG. 38) is integral with the projection 162 and has a curved upper surface 164, an intermediate inclined shoulder 165 and an elongated opening 166 extending laterally therethrough.

A pivot lever 167 (FIGS. 36 and 37) has an actuating end 168 and a winding surface 169 on the opposite end with an inner line gripping surface 171. A pair of spaced depending ears 172 have transverse openings therein to receive a pivot pin 173 extending through the elongated opening 166, one ear having an extension 174 (FIG. 37) which cooperates with the intermediate shoulder 165. A double acting spring 175 has a central coil with one end engaging the actuating portion 168 and the opposite end engaging the projection 162. The finger projection 162 is also slotted at 176 for line cutting means such as disclosed in FIGS. 8–21.

The operation of the present embodiment is substantially the same as that of FIGS. 8–21 except the enlarged opening 166 allows a lateral pivoting or shifting movement of the lever 167 and the pivot pin 173. The lever 167 is shown in its inactive position in FIG. 36 with the spring 175 biasing the lever against the finger projection 162. To tie a knot, the actuating end 168 of the lever 167 is depressed against the force of the spring 175 to lift the winding surface 169 until the ear extension 174 is above the inclined shoulder 165, and the lever is then shifted in a counterclockwise direction, as seen in FIG. 36, until the extension 174 is over and engages the shoulder 165 in winding position. Then a line having a fish hook (not shonw) is wound around the winding surface 169 and the projection 162 in the manner shown in FIGS. 9–18 with the last turn being wound around the end of the lever between the line gripping surface 171 and the projection 162.

A slight tug on the end of the line shifts the lever in a clockwise direction, as seen in FIG. 36, to disengage the ear extension 174 from the shoulder 165 and allow the lever to be biased to grip the end of the line. The hook is then grasped and pulled away from the device to progressively pull the loops of the winding off of the device and form the knot, such as shown in FIG. 18. The spring 175 provides sufficient resiliency to allow the lever and pivot pin to move in a lateral direction due to the enlarged opening 166.

FIGS. 39 through 43 disclose a further simplified knot tying device 177 mounted in a finger projection 178 formed on the handle 11ᵃ of a fishing rod adjacent a recess 12ᵃ for a reel. The finger projection 178 is provided with an elongated slot or cavity 179, and an enlarged passage 181 is provided on one side with an axially aligned internally threaded passage 182 on the opposite side of the slot or cavity and terminating in the counterbore or socket 183. An elongated curved disappearing trigger 184 is positioned within the slot or cavity 179 with an outer end 185 exposed below the end 186 of the projection 178. The upper end of the trigger has a large opening 187 and a small opening 188 adjacent thereto.

A pivot pin 189 has an enlarged head 191 and a smooth shank threaded at the lower end 192 and extends through the slot 179 and the opening 187 in the trigger 184 into threaded engagement with the threaded passage 182; the head 191 being positioned in the enlarged passage 181. A lock nut 193 engages the threaded end 192 of the pivot pin and is located in the counterbore 183. A double-acting spring 194 has its coils encompassing the smooth shank of the pivot pin 189 between the enlarged head 191 and the trigger 184. One end 195 of the spring is engaged in the small opening 188 in the trigger and the opposite end 196 is received in a sfitable opening 197 in the head 191 of the pin 189; with the spring 194 being put under sufficient tension to cause the trigger to be biased in a clockwise direction as seen in FIG. 41.

The trigger also has an integral offset catch 198 formed on the inner edge thereof to cooperate with the adjacent edge 199 of the finger projection 178 and the opposite curved edge of the trigger provides a winding surface 201. A second winding surface 202 is provided on the rear edge of the projection 178, and a line tension holder 203 is also secured to the finger projection 178. In operation, the lower end 185 of the trigger 184 is manually engaged and lifted to rotate the trigger in a counterclockwise direction, as seen in FIG. 39, against the force of the spring 194 to the position shown in FIG. 41, and the trigger is then shifted laterally, as seen in FIG. 40, as the opening 187 is larger than the pivot pin 189 so that the catc 198 will engage the edge 199 of the finger projection at the cavity 179. A fishing line 204 is threaded through the eye or loop 206 of a fish hook 205 with the line from the end of the pole (not shown) extending rearwardly to a point over the line tension holder 203 and then downwardly so that the hook is positioned adjacent the winding surface 202. The end 207 of the line 204 is then wound around the winding surfaces 201 and 202 and the line 204 between the hook 205 and the line tension holder 203 for three loops 208 as seen in FIG. 42.

After the third loop, the line end is then wound around the trigger 184 between the trigger and the edge 199 of the projection 178 at 209 (see FIG. 42). A slight tug on the line end 207 will move the trigger 184 laterally to release the catch 198 from the edge, and the spring 194 then biases the trigger 184 into the slot 179 pulling the line end 207 thereinto to clamp the line end. Now the hook 205 is grasped and pulled downward to progressively remove the loops 208 from the device 177 to tie the knot and then pull the end 207 of the line from the trigger 184 in the same manner as shown in FIGS. 9 through 18.

I claim:

1. A knot tying device comprising an elongated body member having a winding area and a line gripping area at the free end of the body member whereby the free end of a line is wound onto the winding area and onto itself for several turns, the end of the line is clamped in the line gripping area and the turns are removed from the winding area onto the line itself, means to expand the winding area so as to be greater toward the line gripping area to retain the line wound thereon and then contract to aid in removal of the line, and means cooperating with the line gripping area to engage the line and area and securely hold the line until positively released.

2. A knot tying device as set forth in claim 1, including a line cutting notch on the body member.

3. A knot tying device comprising a projection of a handle providing a winding surface and a line gripping end and having an elongated channel, a catch formed in the channel, a body member received in the channel and having a projection formed at the upper end, a lateral line gripping area at the opposite end of the member and a catch notch intermediate the ends, and means biasing the body member upwardly, said winding area being expandable so as to be greater toward the line gripping end to retain a line wound thereon and the contractible to aid in removing the wound line therefrom, the end of the wound line being clamped between the line gripping end and the lateral line gripping area.

4. A knot tying device as set forth in claim 3, including a guide pin extending transversely through said channel, and said body member having an elongated inclined slot adjacent the line gripping area and receiving said pin to provide for downward and outward movement relative to said projection to expand the winding area formed by the winding surfaces adjacent the line gripping area.

5. A knot tying device as set forth in claim 4, in which said projection has an angularly disposed passage opening into said channel at a shoulder, a set screw threadingly engaging said passage and terminating in a reduced, inner end, said body member having a projection thereon generally opposite the set screw, and said biasing means is a compression spring with the opposite ends thereof received on said projection and said reduced end of the set screw.

6. A knot tying device comprising a projection of a handle providing a winding surface and a line gripping surface, an elongated body member having an enlarged actuating end, a pivot for said body member adjacent the actuating end, said body member having a winding surface and a line gripping area on the end opposite the enlarged actuating end and at the opposite side of the pivot, and means biasing said body member so that the line gripping area is urged against the projection but can be lifted to expand the winding area, the winding area being expandable so as to be greater toward the line gripping area to retain a line wound thereon and then contractible to aid in removing the wound line therefrom.

7. A knot tying device as set forth in claim 6, in which said projection has a slot in the end thereof, and a pair of cutter blades are positioned in the slot to converge to sever a line inserted in the slot.

8. A knot tying device as set forth in claim 6, including a trigger pivoted on said projection adjacent said pivot for the body member and biased to rotate and urge one end against the body member, so that when the body member is manually pivoted to lift the winding surface thereon the trigger will be pivoted into the space between the projection and the body member to retain the winding surfaces in their expanded condition.

9. A knot tying device as set forth in claim 8, in which the handle has a recess in the free end thereof and the projection is reciprocable in the recess between a retracted position concealing the knot tying device and an advanced position exposing the knot tying device for use.

10. A knot tying device as set forth in claim 9, in which said projection has a pair of spaced notches therein, and a detent mounted in the handle engageable with either notch to retain the projection in either of its two positions.

11. A knot tying device as set forth in claim 6, including a hinge block integral with the projection and having an inclined intermediate shoulder and an elongated opening therethrough, said elongated body member having a depending ear adapted to cooperate with the shoulder when the body member is pivoted and then shifted laterally.

12. A knot tying device as set forth in claim 11, including a pivot pin in said body member and received in the elongated opening, said opening allowing both pivotal and lateral movement of the body member and the pivot pin.

13. A knot tying device comprising a hollow elongated body member with a closed end having an opening therein, a winding area on the body member and a line gripping area at the closed end of the body member, said winding area having an elongated slot therein, a first lever pivotally mounted in the body member and having an enlarged end, line retaining means on the enlarged end adapted to project through the slot, a second lever pivotally mounted onto said first lever and projecting through the opening in the closed end to terminate in an enlarged knob, resilient means urging the levers to their retracted positions, and latching means on the second lever and said body member to hold the levers in their projected positions, whereby a line wound on the winding area is held by the projected line retaining means and the free end of the line is gripped between the closed end and the knob when the levers are retracted.

14. A knot tying device as set forth in claim 13, in which said line retaining means on the first lever includes spaced fingers defining line retaining notches therebetween.

15. A knot tying device as set forth in claim 13, in which said latching means includes a retainer catch formed on said second lever, and a shoulder on the interior surface of the body member to engage the retainer catch when the second lever is projected from the body member.

16. A knot tying device as set forth in claim 13, in which said resilient means is a coil spring encompassing the pivotal mounting for the first lever and having one end connected to the body member and the opposite end connected to the second lever to yieldably bias both levers in a clockwise direction.

17. A knot tying device as set forth in claim 13, in which said line retaining means includes three spaced fingers on the end of the lever defining a pair of notches therebetween, said resilient means includes a spring having one end secured to the body member and the opposite end connected to the inner end of the second lever to bias both levers in a clockwise direction, and said latching means includes a retainer catch on the second lever intermediate the ends thereof and a shoulder on the interior surface of the body member adapted to be engaged by the catch upon outward movement of the second lever, the catch being biased by the spring into engagement with the shoulder.

18. A knot tying device as set forth in claim 17, in which said second lever is moved outwardly by manually pulling on the enlarged knob thereof.

19. A knot tying device as set forth in claim 17 including an arm at right angles to said first lever and terminating in an enlarged button, said body member having an opening through which the button projects for manual actuation to project the knob and the spaced fingers beyond the body member.

20. A knot tying device as set forth in claim 17, in which the line is wound onto the winding area and through the spaced notches for several turns and then one turn is wound onto the second lever between the body member and projected knob, whereby an upward manual pull on the line end rotates the second lever in a counterclockwise direction to automatically release the catch from the shoulder and allow the levers to return to their retracted positions so that the turns can be removed from the winding area to form a knot.

21. A knot tying device comprising a projection of a handle having an elongated slot therein, an elongated body member pivotally mounted in the slot, the body member including a curved trigger having a lower end exposed below the end of the projection, the projection and the trigger having a winding area including opposed winding surfaces thereon to receive a line wound thereon and a line gripping area on the inner edge of the trigger received within the slot, said winding area being expandable so as to be greater toward the line gripping area to retain the line wound thereon and then contractible to aid in removing the wound line therefrom.

22. A knot tying device as set forth in claim 21, including a pivot pin extending through the projection and the trigger, spring biasing means secured to the trigger and the pivot pin to bias the trigger to an inactive position within the projection, and an offset catch formed on the edge of the trigger to engage the edge of the projection when the trigger is in an expanded winding position.

23. A knot tying device as set forth in claim 22, in which the catch is formed on the edge of the trigger opposite to the winding surface thereof, said trigger being rotated away from said projection and moved laterally to engage the catch with the edge of the projection.

* * * * *